(12) United States Patent
Swaminathan et al.

(10) Patent No.: US 10,311,719 B1
(45) Date of Patent: Jun. 4, 2019

(54) ENHANCED TRAFFIC DETECTION BY FUSING MULTIPLE SENSOR DATA

(71) Applicant: ITERIS, INC., Santa Ana, CA (US)

(72) Inventors: Dilip Swaminathan, Costa Mesa, CA (US); Manu P. Jain, Yorba Linda, CA (US); Yan Gao, Placentia, CA (US); Todd W. Kreter, Irvine, CA (US); Michael T. Whiting, Rancho Santa Margarita, CA (US)

(73) Assignee: ITERIS, INC., Santa Ana, CA (US)

( * ) Notice: Subject to any disclaimer, the term of this patent is extended or adjusted under 35 U.S.C. 154(b) by 0 days.

(21) Appl. No.: 16/201,952

(22) Filed: Nov. 27, 2018

Related U.S. Application Data

(63) Continuation of application No. 16/112,072, filed on Aug. 24, 2018, now Pat. No. 10,140,855.

(51) Int. Cl.
  *G08G 1/01* (2006.01)
  *G08G 1/015* (2006.01)
  *G08G 1/04* (2006.01)

(52) U.S. Cl.
  CPC .......... *G08G 1/0125* (2013.01); *G08G 1/015* (2013.01); *G08G 1/04* (2013.01)

(58) Field of Classification Search
  CPC ......... G08G 1/0125; G08G 1/015; G08G 1/04
  USPC ......................................................... 340/933
  See application file for complete search history.

(56) References Cited

U.S. PATENT DOCUMENTS

| | | | |
|---|---|---|---|
| 2006/0155442 A1* | 7/2006 | Luo | G06K 9/00369 701/45 |
| 2013/0253754 A1* | 9/2013 | Ferguson | G05D 1/0231 701/28 |
| 2014/0195138 A1* | 7/2014 | Stelzig | G08G 1/0116 701/119 |
| 2016/0070265 A1* | 3/2016 | Liu | B64C 39/024 701/3 |

* cited by examiner

*Primary Examiner* — Kerri L McNally
(74) *Attorney, Agent, or Firm* — Lazaris IP

(57) ABSTRACT

A framework for precision traffic analysis combines traffic sensor data from multiple sensor types, combining the strengths of each sensor type within various conditions in an intersection or roadway in which traffic activity occurs. The framework calibrates coordinate systems in images taken of the same area by multiple sensors, so that fields of view from one sensor system are transposed onto fields of view from other sensor systems to fuse the images taken into a combined detection zone, and so that objects are properly detected and classified for enhanced traffic signal control.

1 Claim, 4 Drawing Sheets

ENHANCED TRAFFIC DETECTION BY FUSING MULTIPLE SENSOR DATA

CROSS-REFERENCE TO RELATED PATENT APPLICATION(S)

This patent application claims priority to, and is a continuation of, U.S. non-provisional application Ser. No. 16/112,072, filed on Aug. 24, 2018, the contents of which are incorporated in their entirety herein. In accordance with 37 C.F.R. § 1.76, a claim of priority is included in an Application Data Sheet filed concurrently herewith.

FIELD OF THE INVENTION

The present invention relates to the field of traffic detection. Specifically, the present invention relates to a system and method of combining different sensor types to enhance the detection of objects in a traffic environment, by overlaying sensor data from one sensor type onto sensor data from a different sensor type to enhance accuracy of object detection and identification.

BACKGROUND OF THE INVENTION

There are many conventional traffic detection systems. Conventional systems typically utilize a single sensor type, either in the roadway itself, or positioned at a roadside location or on traffic lights proximate to the roadway. The most common type of vehicular sensors are inductive coils, or loops, embedded in a road surface. Other existing systems utilize video cameras, radar sensors, acoustic sensors, or magnetometers, either in the road itself, or at either the side of a roadway or positioned higher above traffic to observe and detect vehicles in a desired area. Each of these sensors provide information used to determine a presence of vehicles in specific lanes in intersections, to provide information to traffic signal controllers for proper actuation.

These conventional detection systems are commonly set up with 'virtual zones', which are hand- or machine-drawn areas on an image, taken from data collected by a sensor, where objects may be moving or present. Traditionally, a vehicle passes through or stops in a zone, and these zones generate an "output" when an object is detected as passing through or resting within all or part of the zone.

Many existing detection systems are capable of detecting different types of vehicles or objects, such as cars, trucks, bicycles, motorcycles, pedestrians, etc. Some sensor types, along with the algorithms associated with them, are more suitable than others for differentiating between these types vehicles or objects, and therefore detection quality varies depending on the type of sensor system used. For example, some systems are unable to differentiate between objects of a similar type, for example between motorcycles and bicycles, as the sensor data is too similar for the system to algorithmically separate these types of objects.

Different sensor types also have different limitations due to their base technology, application, and operating environment. For example, Doppler-type radar can detect moving objects and identify their position and speed, but they cannot detect stopped objects. Loops and magnetometers can detect and classify stopped or moving vehicles, however, they cannot detect as accurately during periods of dense traffic. Additionally, loops and magnetometers cannot be installed without cutting or boring into the pavement.

Environmental conditions also play a part in sensor data quality. Heavy fog can restrict the distance at which a camera sensor can see the field of view. Similarly, certain conditions, such as rain, sleet, and ice, can reduce or completely impair the performance of a radar sensor.

Accordingly, there is a need for improvements in the performance of existing sensing systems for traffic detection. Combining the best features of two or more sensor types within the same detection system allows for improvements in optimal performance, irrespective of sensor limitations or environmental conditions.

BRIEF SUMMARY OF THE INVENTION

It is therefore one objective of the present invention to provide a system and method for detecting multiple objects in a single traffic field of view using multiple sensing devices. It is another objective of the present invention to provide a system and method of accurately classifying objects identified within a combined traffic detection zone, using data from different types of sensors. It is still another objective to provide a system and method to overlay the field of view from one sensor type with the field of view of another sensor type, to allow combining data from each to enhance detection accuracy. It is still a further objective of the present invention to combine detection from different sensor systems to improve traffic intersection control.

The present invention provides systems and methods of identifying an area of interest in a field of view of a sensor, otherwise referred to as a traffic detection zone, and generating the equivalent region of interest relative to a second sensor. These systems and methods enhance the reliability and accuracy of detecting objects in the traffic detection zone under various environmental conditions, and also improve the ability to differentiate between types of vehicles and objects detected within a traffic environment. The present invention therefore provides a fusion of sensor types for a traffic detection framework that is initialized by identifying an area of interest and drawing traffic detection zones for one sensor type, and transposing these zones to the equivalent area of interest for a second sensor type. Such a framework for traffic detection is also configured to provide outputs dependent on zone type and under all road traffic conditions.

As noted above, these systems and methods combine detection outputs from multiple sensing systems for a traffic signaling environment. The present invention also provides a decision support tool that supports traffic operations based on the output of the fusion of sensor types, and enables users to improve and optimize performance of traffic signals based on the enhanced detection accuracy provided by the fission of detection from multiple sensing systems.

Other objects, embodiments, features and advantages of the present invention will become apparent from the following description of the embodiments, taken together with the accompanying drawings, which illustrate, by way of example, the principles of the invention.

BRIEF DESCRIPTION OF THE SEVERAL VIEWS OF THE DRAWINGS

The accompanying drawings, which are incorporated in and constitute a part of this specification, illustrate several embodiments of the invention and together with the description, serve to explain the principles of the invention.

DETAILED DESCRIPTION OF THE INVENTION

In the following description of the present invention reference is made to the exemplary embodiments illustrating the principles of the present invention and how it is practiced. Other embodiments will be utilized to practice the present invention and structural and functional changes will be made thereto without departing from the scope of the present invention.

Figure 1:
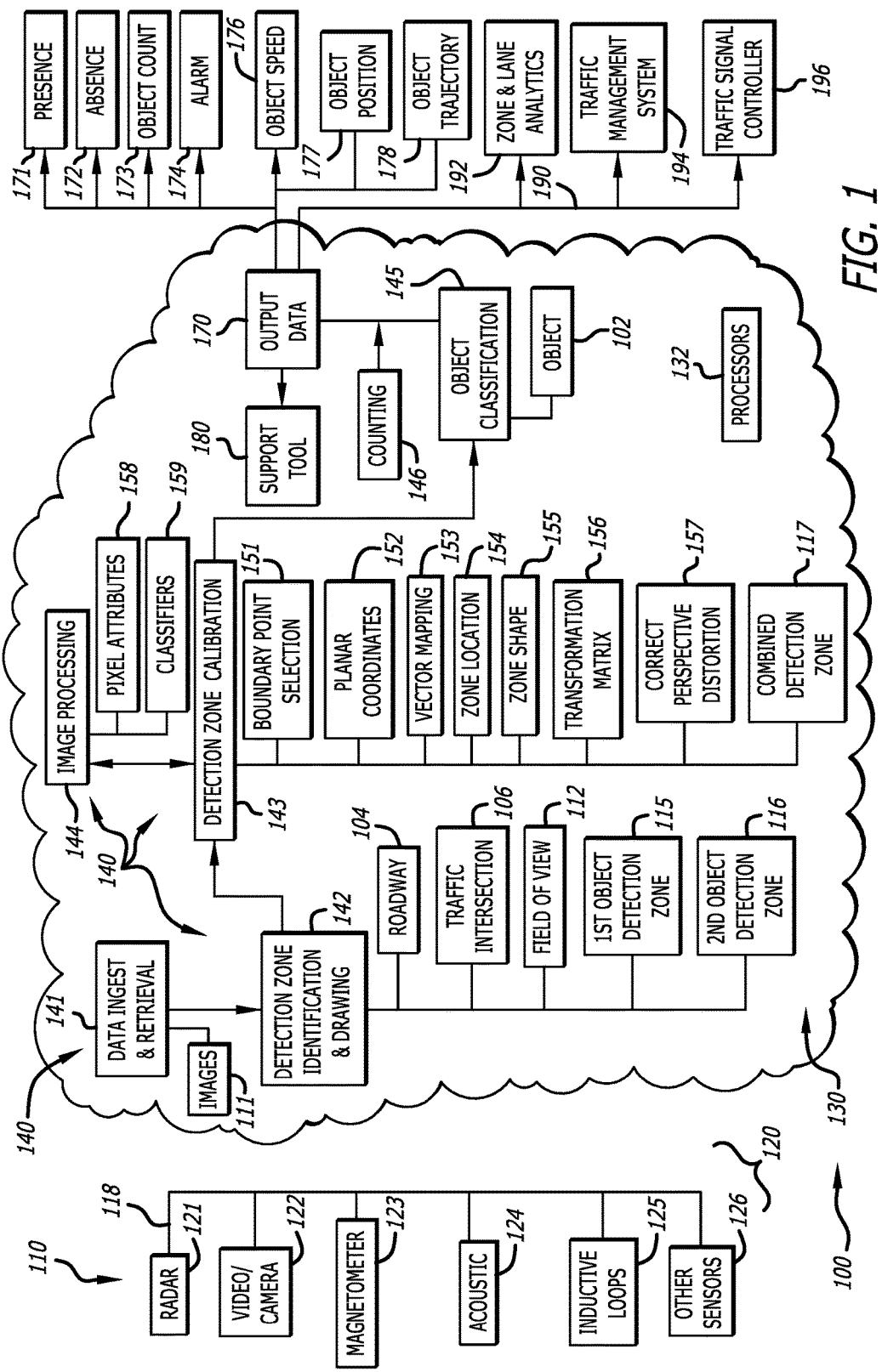
FIG. 1 is a system diagram for an enhanced traffic detection framework according to one aspect of the present invention.

FIG. 1 is a system diagram of an enhanced traffic detection framework 100 in which images 111 captured by different types of sensors 120 are fused together to detect objects 102 in a roadway 104, for example at or near a traffic intersection 106. The framework 100 is performed within one or more systems and/or methods that includes several components, each of which define distinct activities and functions for combining images 111 from different types of sensors 120, and for accurately detecting and classifying objects 102 in a field of view 112 of the roadway 104, for improvements in traffic intersection control and public safety.

The enhanced traffic detection framework 100 ingests, receives, requests, or otherwise obtains input data 110 that includes different images 111 representing the field of view 112 of a roadway 104 as noted above, and from which one or more object detection zones 114 may be drawn or configured. Images 111 in the input data 110 are obtained from sensor data 118 collected from the one or more sensors 120, which may be positioned in or near a roadway area 104 for which the one or more object detection zones 114 are to be identified and configured or drawn. The one or more sensors 120 may include radar systems 121, video systems 122 such as cameras and thermal cameras, magnetometers 123, acoustic sensors 124, inductive loops 125, and any other devices or systems 126 which are capable of detecting a presence of objects 102 within a traffic environment, for example light-based (such as ultraviolet, visible, or infrared light) or laser-based sensing systems, such as LiDAR. It is to be understand that any combination of such sensors 120 may be used to detect objects 102.

Images 111 from the input data 110 are applied to a plurality of data processing components 140 within a computing environment 130 that also includes one or more processors 132, a plurality of software and hardware components, and one or more modular software and hardware packages configured to perform specific processing functions. The one or more processors 132, plurality of software and hardware components, and one or more modular software and hardware packages are configured to execute program instructions to perform algorithms for various functions within the enhanced traffic detection framework 100 that are described in detail herein, and embodied in the one or more data processing modules 140.

The plurality of data processing components 140 include a data ingest component 141 configured to ingest, receive, request, or otherwise obtain the input data 110 as noted above, and a detection zone identification and configuration component 142 configure to identify and set up object detection zones 114 for each sensor 120 collecting sensor data 118 within the framework 100. The plurality of data processing modules 140 also include a detection zone calibration component 143 that fuses sensor data 118 into a combined detection zone 117, and may further include other components such as an image processing component 144, an object classification component 145, a counting component 146, and any other component to be used in identifying and classifying one or more objects 102 in an object detection zone 114 and the combined detection zone 117.

These data processing components 140 are configured to generate output data 170 that may take many different forms. Output data 170 may include an identification of one or more objects 102 in the roadway 104, and this may further include a confirmation that an object 102 is present 171 in the roadway 104, or confirmation that an object 102 is absent 172 from the roadway 104.

The output data 170 may also include a type or classification of each object 102, and a count 173 of each of the one or more objects 102, according to one or more embodiments of the present invention. The output data 170 may also include an alarm 174 such as a verbal, visual, aural, or other indication, for example to indicate that an incident has been detected in a pedestrian area. Alarms 174 may be configured to warn of many different incidents or activities in a roadway. Alarms 174 may be configured to warn of various incidents or activities that can cause abnormal pedestrian and vehicle movements. Incidents may include prone objects such as pedestrians that may have fallen to the pavement, the presence of unauthorized vehicles in a pedestrian area, or a pedestrian or other object attempting to cross the intersection against a red indicator or while crossing traffic has a green light. Still others may include stalled vehicles, objects that have fallen from moving vehicles, motorcyclists or bicyclists who are down, or objects placed in a pedestrian movement zone by someone. It is to be understood that many types of alarms are possible, and therefore the present invention is not to be limited to any one type of alarm 174 or incident mentioned herein.

An object's speed 176 may also be calculated, so that for example where an object 102 is classified as a pedestrian, the output data 180 may also include a calibrated pedestrian speed 176. An object's position 177 may also be calculated, as well as an object's trajectory 178. Other outputs are also possible, such as an indicator that identifies late arrivals in a pedestrian crosswalk. Such an indicator may be used to extend and/or adjust signal timing for safe intersection passage. Output data 170 may also be provided for additional analytics and processing in one or more third party or external applications 190. These may include a zone and lane analysis component 192, a traffic management system 194, and a traffic signal controller 196.

The detection zone calibration component 143 fuses images 111 in the sensor data 118 by performing several functions 150, each of which apply one or more of mathematical functions, algorithms, machine learning, or other data processing techniques to create a combined object detection zone 116. These functions include a selection 151 of a plurality of boundary points in a first detection zone 115, and of corresponding boundary points in a second detection zone 116.

The functions 150 also correct a perspective distortion 157 between images 111 collected by the different sensors 120 to transpose the first object detection zone 115 onto the second object detection zone 116 to create the combined detection zone 117. This is accomplished by applying the selected boundary points 151 to calibrate arbitrary planar coordinates 152 between the first object detection zone 115 and the second object detection zone 116, and mapping a plurality of vectors 153 representing common data points to transform the arbitrary planar coordinates 152 to find an equivalent zone location 154 and an equivalent shape 155 between the first object detection zone 115 and the second object detection zone 116. This transformation may be performed either linearly or non-linearly, as described further herein.

As noted below, the framework 100 estimates a transformation matrix 156 to correct this perspective distortion 157 between images 111 in the sensor data 118. This calculation of an estimate is accomplished by mapping multiple points (the arbitrary planar coordinates 152) in a plane of the roadway 104 as seen by the second sensor 120, to multiple points in a plane of the roadway 104 as seen by the first sensor 120. As noted below the selected boundary points 151 may be any number that provides for an accurate transformation of sensor data 118 representing images taken from different sensors 120.

The image processing component 144 utilizes information analyzed in the detection zone calibration component 143 to evaluate one or more pixel attributes 158 in the combined detection zone 117 to detect, identify, and classify an object 102 in the field of view 112 of the roadway 104. As discussed below, pixel attributes and characteristics 158 may be evaluated in many different ways to perform the detection, identification and classification functions of a traffic detection system according to the present invention.

Figure 2:
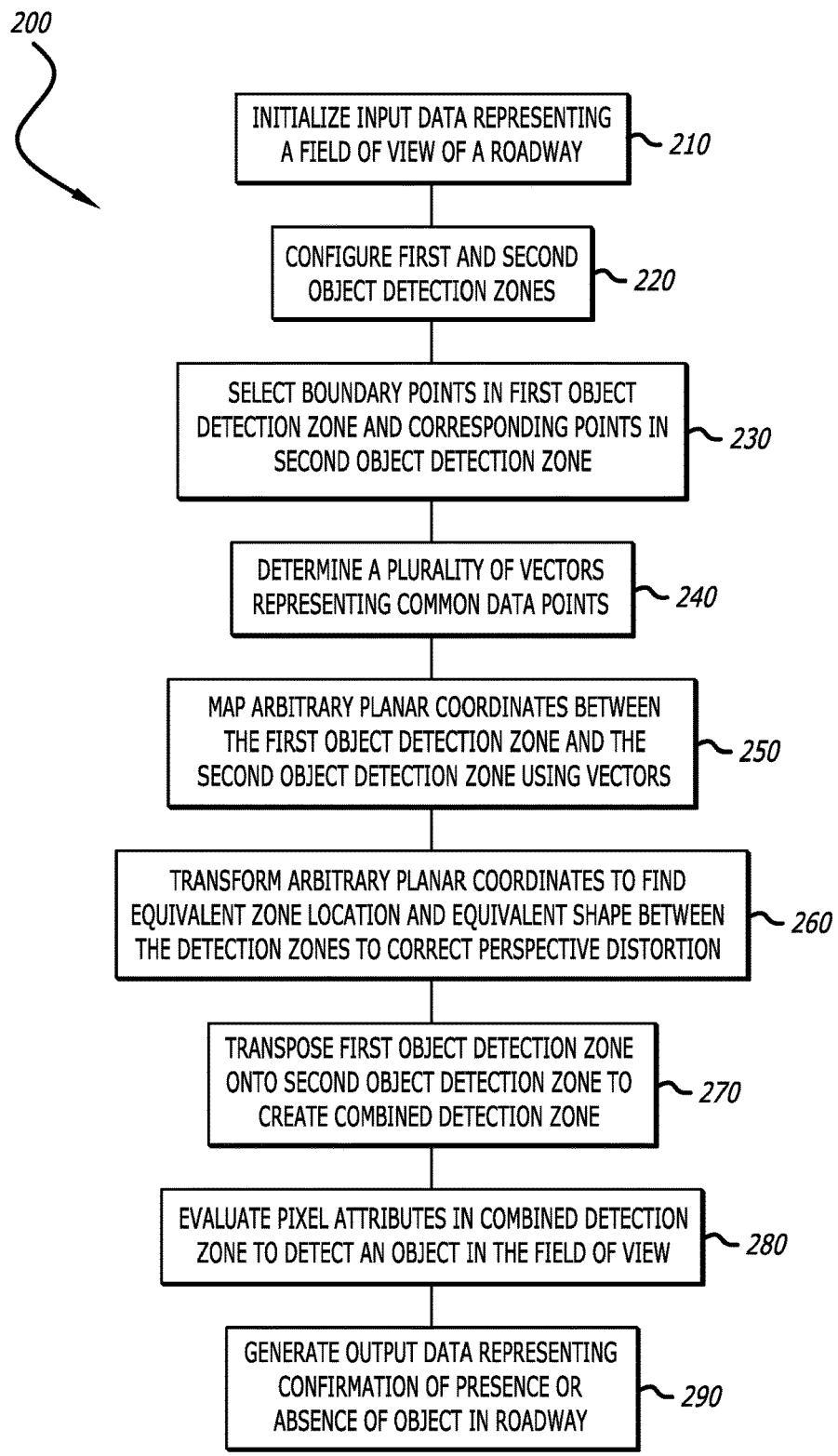
FIG. 2 is a flowchart of steps performed for the enhanced traffic detection framework according to one aspect of the present invention.

FIG. 2 is a flowchart illustrating steps in a process 200 for performing the enhanced traffic detection framework 100, according to certain embodiments of the present invention. Such a process 200 may include, as noted above one or more functions, mathematical models, algorithms, machine learning processes, and data processing techniques for the components 140 that perform detection zone identification and calibration, image processing and object classification within such a framework 100, and for the various analytical approaches applied within each component 140.

The process 200 is initialized at step 210 by retrieving input data 110 collected by sensors 120 and representing a field of view 112 at or near a traffic intersection 106. The process 200 then identifies and configures object detection zones 115 and 116 representing images 111 of the roadway 104 taken by each sensor 120 at step 220.

The process 200 then begins its analysis of the images 111 for calibrating detection zones, by selecting a number of boundary points 151 in the first object detection zone 115, and then selecting boundary points 151 in the second object detection zone 116 that correspond to those selected for the first detection zone 115 at step 230.

The process 200 then uses these selected boundary points 151 as reference points to begin the process of removing perspective distortion 157 between images 111 collected by the sensors 120. This occurs beginning at step 240, by determining a plurality of vectors 153 that represent common data points between the first detection zone 107 and the second detection zone 108. The vectors 153 are then used at step 250 to map a plurality of arbitrary planar coordinates 152 between the first and second detection zones 115 and 116, and this mapping of vectors 153 is then used to transform the planar coordinates 152 to find equivalent zone locations 154 and equivalent shapes 155 at step 260 and correct the perspective distortion 157.

It is to be noted that the number of boundary points 151 may be any number which enables accurate mapping of data points for a transformation of planar coordinates 152 to find equivalent zones and equivalent shapes across images taken by different sensors 120, and which still provides for an adequate correction of perspective distortion 157 in these images. For example, in different embodiments of the present invention, the number of boundary points 151 selected may be two or more, three or more, four or more, or x or more, and the selection of the appropriate number of boundary points 151 may depend at least in part on sensor characteristics, such as camera or radar position and angle vis-à-vis the field of view, image quality due to factors such as weather conditions, and any other characteristic that may impact degradation and/or accuracy of mapping of vectors 153. In one such exemplary embodiment, images captured from a top-down view provided by a radar sensor may only need two boundary points 151. Therefore, fewer (or greater) numbers of boundary points 151 may be selected, and it is within the scope of the present invention for different numbers of boundary points 151 to be selected to correct the perspective distortion 157 using the transformation matrix 156.

Once perspective distortion 157 has been corrected using the equivalent zone locations 154 and equivalent shapes 155 at step 260, the process 200 continues at step 270 by transposing the first object detection zone 115 onto the second object detection zone 116, to create a combined detection zone 117 where the common data points and planar coordinates match in the equivalent zone locations 154 and shapes 155. At step 280, the combined detection zone 116 is used by the image processing component 144 to evaluate pixel attributes 158 and detect and identify an object 102 in the field of view 112. At step 290, output data 170 is generated that represents at least a confirmation of a presence 171 of an object 102 in the field of view 112, or a confirmation of an absence 172 of an object 102 in the field of view 112.

As noted above, there are many types of sensors 120 used for detection at traffic intersections 106 and in roadways 104. Each system deployed at an intersection or roadway has both strengths and weaknesses. For example, inductive loops 125 work well for detecting vehicles. However, these sensors 120 do not perform well for detecting bicycles, and cannot detect pedestrians at all. Radar sensing systems 121 also work well for detecting vehicles at a distance from a stop bar, but may struggle to detect stopped vehicles, and may not perform well in certain environmental conditions. Video detection systems 122 perform well in differentiating between vehicles, bicycles and pedestrians at the stop bar, but performance drops well in advance of the stop bar, as well as in certain environmental conditions. It is to be understood that the examples above are not intended to be an exhaustive list of the benefits and issues with each sensor type, but to promote the understanding that no one sensor type is good or more useful in all situations required by modern traffic engineering and particularly with intersection signaling systems.

Improvements to existing detecting systems using multiple sensors 120 may be achieved by taking two different sensor types, where the strengths of one type compensate for the weaknesses of the other type, and aiming them at the same roadway 104 to compensate for these inherent problems. In one example, one type of sensor 120 may be a radar system 121, and the second type of sensor 120 may be a video system 122. Strengths of radar systems 121 include a lack of sensitivity to inclement weather, providing a direct measure of speed, multiple lane operation, low maintenance, and no reliance on lighting or headlights. Strengths of video systems 122 include the ability to monitor multiple lanes, ease of adding or modifying detection zones, ability to handle a multitude of traffic data, spatial object information, and pedestrian and bicycle tracking. A multi-sensor system as in the framework 100 of the present invention, that combines these strengths, can be applied to provide an enhanced detection system across all roadway 104 and environmental conditions.

It is not, however, a simple matter to aim two disparate sensors 120 at the roadway 104 and improve detection and traffic signaling efficiency. A system utilizing such disparate sensor systems needs to be calibrated, so that data from one sensor type can be matched with the other sensor type. Further, the fusion of these two data sets (which are inherently different) need to be converged programmatically to provide output data 170 that is useful for traffic control.

One challenge of using two different sensor types is aligning the fields of view 112 of both sensors 120, so that data collected can identify common objects 102, and also identify when one sensor type has missed or mischaracterized an object 102. Due to the different characteristics of each sensor 120, any two different sensor types, while able to cover the same lanes of traffic, may not have the same field of view 112.

Camera sensors 122, for example, have a 'triangle' pattern with the x-x angle and y-y angle being fixed. Camera sensors 122 use more pixels to describe objects nearer to the sensor and fewer pixels for objects at the further limits of its field of view 112. Therefore, the resolution of an image taken by a video sensor 122 changes with linear distance and are subject to lens distortions. Cameras have no maximum view, but objects beyond a certain distance provide no useful data for algorithmic evaluation.

Figure 3:
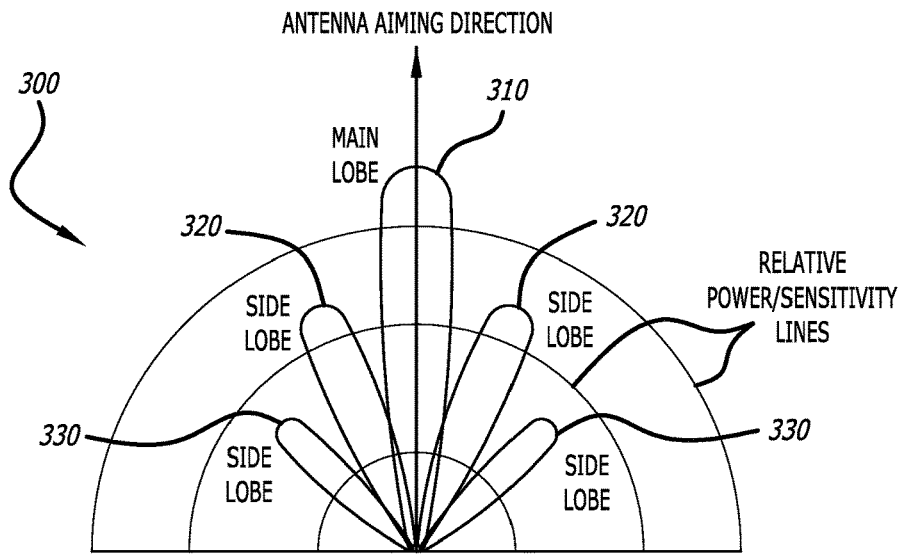
FIG. 3 is a diagram illustrating a beam pattern of a radar signal.

Radar sensors 121, in contrast, have a 'lobe' beam pattern 300 as seen in FIG. 3. The center, or main lobe 310 of this beam pattern 300 provides the strongest signal return, but as the lobe beam pattern 300 extends outwards and sideways from the sensor 121 in its 'side' lobes 320 and 330, the signal strength is reduced until no useful return signal is received by the sensor 121. Radar has an inherent limit to its field of view, at least because of antenna design and signal strength. Limitations on radar signal strength are controlled by governmental agencies.

Figure 4:
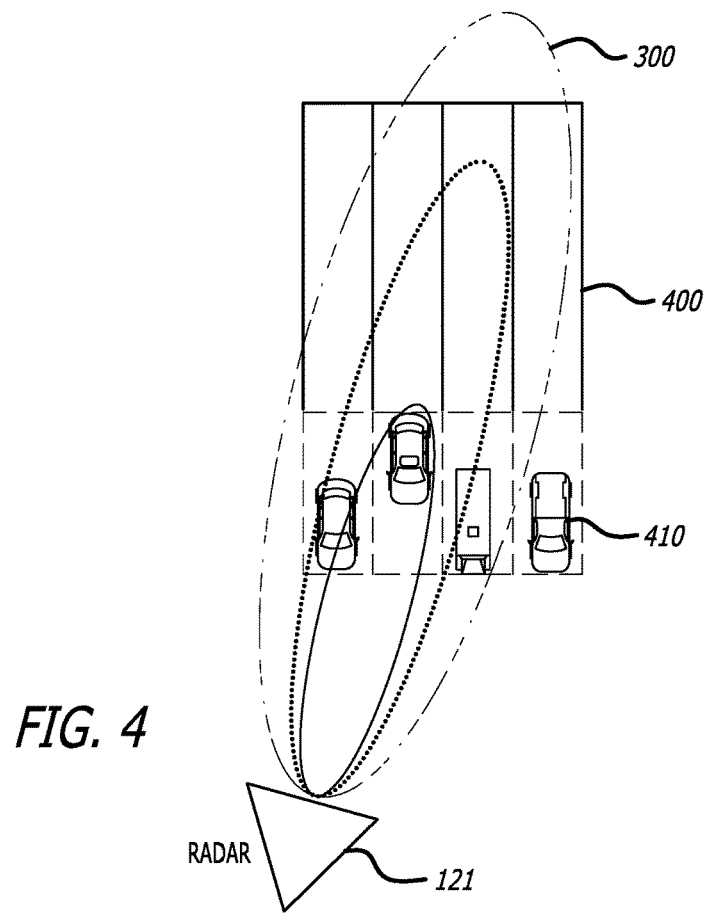
FIG. 4 is a diagram illustrating a beam pattern of a radar a signal overlaid on an image of a region of interest as seen by a video camera.

Overlaying the beam pattern 300 from a radar sensor onto the video image 400 (or vice versa) exposes these differences. From FIG. 4, one can see that vehicle D 410 may not get detected by the radar sensor 121, however, the video image 400 is able to detect the same vehicle.

Some sensor types, cameras 122 for example, have an output which facilitates easy positioning of the detection zones 114 as the user can draw these zones directly onto the stream of video images 400 being provided. Other sensor types, radars 121 for example, require a configuration tool to simulate the roadway 104 under review and require the user to configure zones on this artificial representation of the roadway 104.

In the first sensor example above, the configured zones are positioned relative to the image being displayed and no absolute distances from the sensor 120 or other fixed object in the field of view 112 are necessary or are calculated. In the second example above, all configured zones relative to the sensor 120 and absolute distances from the sensor 120 are calculated from proper system operation.

Figure 5:
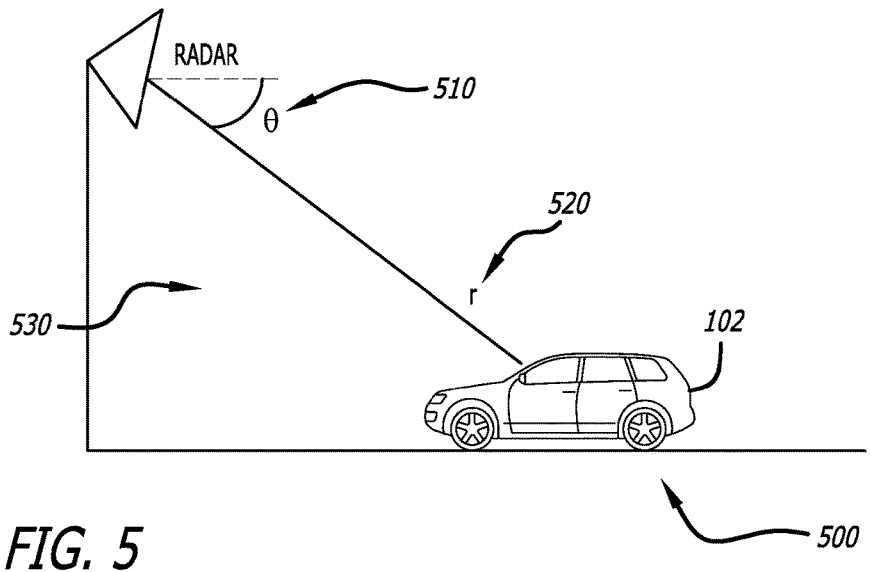
FIG. 5 is a graphical illustration of a field of view as seen by a radar sensor.

FIG. 5 is a graphical representation 500 of an image plane 530 as seen by a radar sensor 121. Radar sensors 121 transmit high frequency radio waves, and estimate the azimuth (θ) 510 and range (r) 520 of moving objects 102 in a field of view 112 using the Doppler effect, which is the change in frequency or wavelength of a wave for an observer who is moving relative to the wave source. The azimuth 510 and range 520 angles in FIG. 5, which are observed as polar coordinates therein, can be converted into a planar 2D Cartesian coordinate representation by the formulas $$Xr = r * \cos \theta$$

and $$Yr = r * \sin \theta$$

yielding a 2D representation of the objects 102 on the road plane 500 with the location of the sensor 121 representing the origin.

Figure 6:
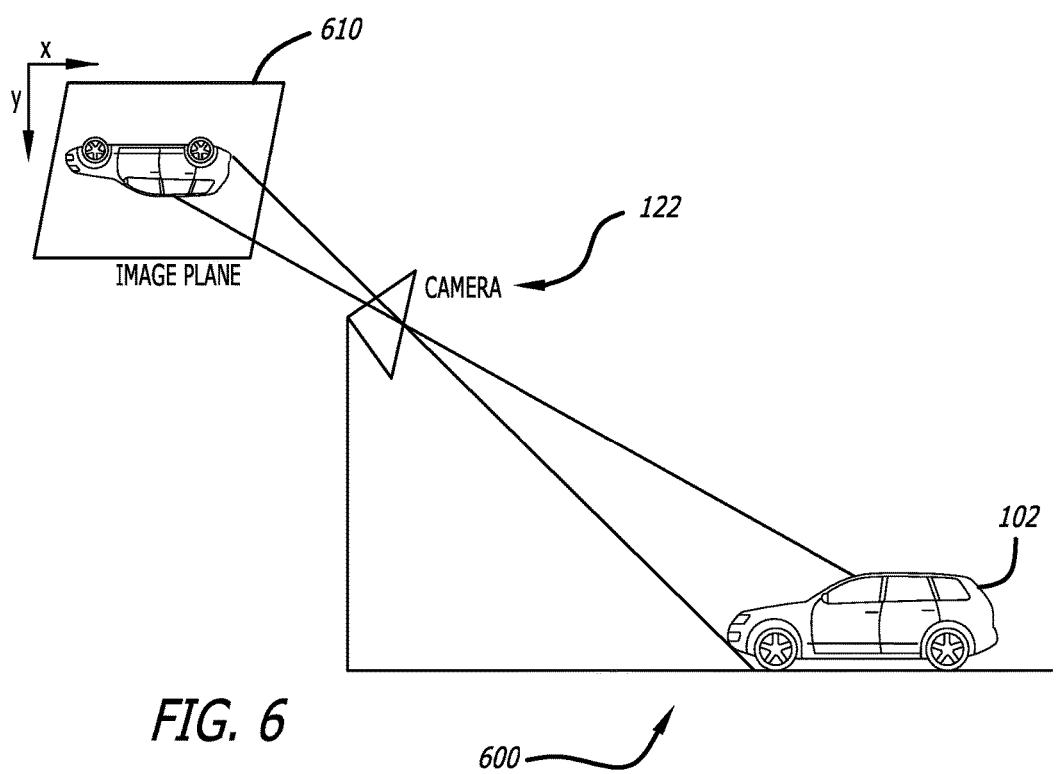
FIG. 6 is a graphical illustration of a field of view as seen by a camera sensor.

Cameras 122, conversely, use image sensors that capture the reflected light rays from objects 102 in field of view 112 into pixel intensities on the image plane 610 as shown in FIG. 6. FIG. 6 is a graphical representation 600 of an image plane 610 as seen by a camera sensor 122.

Even though both sensors 120 are capable of representing real world objects in one or more dimensions, the sensor coordinate systems are quite different, and therefore matching objects 102 across images 111 taken by different sensors 120 becomes an issue. Accordingly, the framework 100 of the present invention calibrates the coordinate systems, so that fields of view 112 from one sensor system 120 can be transposed onto fields of view 112 from other sensor systems 120 to fuse images 111 taken from them together into a combined detection zone 117, so that objects 102 can be properly detected and classified for enhanced traffic signal control.

One approach to determining the real-world coordinates of any point on an image plane is by accurately determining the intrinsic and extrinsic parameters of the camera. However, performing a camera calibration for traffic monitoring applications is cumbersome, as it increases the complexity of the setup process. As the framework 100 is interested only in the objects 102 present in the road plane in the context of traffic monitoring, it is possible to map the roadway plane in the image from the video sensor 122 to the roadway plane as viewed by the radar 121, if the perspective distortion 157 of the image from the video sensor 122 can be corrected or removed to achieve a "birds eye" view of the roadway plane. Such a mapping allows for the transformation of any set of two-dimensional points from one sensor 120 to the other. This can be achieved by estimating, as noted above, a homography matrix 156 that maps the roadway plane as seen by a camera/video sensor 122 to the roadway plane as seen by the radar sensor 121, to achieve matching images 111 taken from the two different sensor systems.

In projective geometry, homography is an invertible mapping technique that preserves the collinearity of three points in one projective space into another. In the present invention, homography is used to transform a quadrilateral (or any other geometric shape) from one reference system into another, where one reference system is the field of view 112 of a sensor type. Homography is therefore used to correct perspective distortion 157 between images 111, and accomplishes this using corresponding points from both reference systems with 3 non-collinear points.

The formulas below demonstrate how homography can be used to correct the perspective image distortion. Let Xr: (xr,yr,1), and Xc: (xc,yc,1) represent the homogeneous coordinates of an object 102 in the roadway plane as seen by the radar sensor 121 and the camera sensor 122, respectively. As both sensors 120 are viewing the same planar object from different viewing angles, their relationship can be established as follows:

$$X_c = H X_r$$

$$X_r = H^{-1} X_c$$

$$\begin{pmatrix} x_c \\ y_c \\ 1 \end{pmatrix} = \begin{pmatrix} h_{11} & h_{12} & h_{13} \\ h_{21} & h_{22} & h_{23} \\ h_{31} & h_{32} & h_{33} \end{pmatrix} \begin{pmatrix} x_r \\ y_r \\ 1 \end{pmatrix}$$

where H is a non-singular homogeneous matrix with 8 degrees of freedom. Using a plurality of corresponding points between images 111 from the two sensor systems, H can be estimated by a least squares method. Since H is also invertible, any point on the roadway plane can be transformed from one sensor 120 to the other.

In a preferred embodiment of the present invention, an initial detection zone configuration is performed on a field of view 112 presented by the radar sensor 121 in a first step. Virtual detection zones 114 are set up at absolute and relative distances from the radar sensor 121. For example, a detection zone 114 may be drawn 90 feet from the sensor (absolute distance). This would be its reference point, and the zone 114 may for example be 12 feet wide and 40 feet long (relative distances from the reference point). These detection zones 114 are primarily used to determine the presence of objects 102 of interest (e.g. cars, trucks, buses, bicycles, pedestrians, etc.) for the purpose of traffic signal actuation. Multiple zones 114 may be drawn to cover multiple traffic lanes and other areas of interest in the field of view 112, including pedestrian crossings, bicycle lanes etc. These detection zones 114 establish region(s) of interest for the sensors 120.

A second step is to identify the extreme points (for example, four points representing the top left, top right, bottom right and bottom left) of a detection zone 114 from the second sensor 120, which in this example is a video image taken by a camera 122. These four points may be identified algorithmically, programmatically or manually. The camera image is a perspective projection representation of the scene, and therefore the image coordinates correspond to pixel locations in the image relative to the origin pixel (0,0) of the image, which is usually the top left corner.

The next step is to estimate a homography matrix 156 based on the set of corresponding points between the sensors 120. Using the mapping from the homography matrix 156, detection zones 114 setup using the radar sensor 121 can be readily transposed to the camera sensor 122, and equivalent detection zones between images 111 from the two sensors 120 can then be established.

This mapping therefore involves selecting the four extreme/boundary points 151 from radar zones (such as top left, top right, bottom right, bottom left from the example above), and then choosing points on the image to match the four selected points on radar space. The present invention then estimates H (a homography matrix 156), and applies this outcome to transform the coordinates of radar zones (represented as Z_r) to estimate their corresponding location on the image space as seen by the video camera 122 (represented as (Z_v).

As noted above, the radar coordinate system can be described in 2D Cartesian/rectangular units of measurement (either metric or imperial units, and represents points only on the road/ground plane. The video coordinate system is also expressed as 2D Cartesian/rectangular units, wherein the units are pixels. These represents points on multiple planes, as seen on the video, which is a projection of the 3D world onto the 2D video by camera imaging principles. This includes the ground/road plane in which the present invention is interested in detecting objects in the roadway.

Using the set of four corresponding points on the road/ground plane between the radar and video coordinate systems, and the estimated homography matrix (H) 156, the present invention then maps arbitrary planar points between the coordinate systems using vectors 153 representing the common data points. The present invention maps a radar detection zone, drawn by the user manually or set up automatically, which may be of any shape. In one example, the zone has the shape 155 of a quadrilateral, represented as [{X_r_1, Y_r_1}, {X_r_2, Y_r_2}, {X_r_3, Y_r_3}, {X_r_4, Y_r_4}]. This is mapped to an equivalent shape 155 in the video detection zone, represented as [{X_v_1, Y_v_1}, {X_v_2, Y_v_2}, {X_v_3, Y_v_3}, {X_v_4, Y_v_4}], by a linear transformation, represented as [X_v, Y_v]=H*[X_r,Y_r] where [X_r,Y_r] & [X_v,Y_v] are vectors and H is a matrix. Once the equivalent shapes 155 and locations 154 are found, regions of interest across both sensor coordinate systems are established in a combined object detection zone. It is to be understood that mapping to an equivalent shape 155 in the video detection zone may also occur using other transformations of arbitrary planar coordinates to find an equivalent zone location and an equivalent shape, such as geometric camera calibration to estimate parameters of the camera, or using stereoscopic images from multiple cameras to estimate the depth of objects.

As noted above, each sensor type has inherent benefits and drawbacks. In addition to providing enhanced detection, the benefits extend to the gathering of traffic activity data at a traffic intersection 106. Modern traffic engineering departments are in need of a varied and accurate data set to help plan and coordinate the efficient flow of traffic through an intersection and a city's traffic network.

As part of this activity data, radar sensors 121 can provide accurate measurements of object range and speed 176. They can also provide trends of vehicle volume and movement (left turns, through traffic and right turns). Video sensors 122 can provide accurate counting 173 of vehicle volume and movement and counting of other roadway users, bicyclist and pedestrians for example. Both sensor types can provide measurement of traffic lane occupancy which is another important measurement for traffic engineers. Sensor data 118 may also be evaluated to determine an object's position 177 and an object's trajectory 178.

Vehicle, bicycle and pedestrian detection zones 114 are typically drawn in various places in the field of view 112 depending on user requirements. In most situations, traffic engineering systems require detection at or near stop bar at an intersection or traffic signal. Detection zones 114 are usually drawn above the stop bar, and an algorithm is applied to identify the objects nearest to the stop bar. An area comprised of a pedestrian strip is created up to the top line of these zones 114, extending from the left to right edge of the field of view 112 below the top lines of the zones 114. The pedestrian strip height is determined by a calculation of the vehicle and bicycle zone heights, and may be extended to cover a larger area that is more likely to be used by all pedestrians 102.

The enhanced traffic detection framework 100 of the present invention may be deployed in many different operational circumstances. For example, the present invention may be used to detect and identify objects 102 during adverse weather conditions when physical danger may increase due to reduced visibility, and multiple sensors 120 may be used to increase accuracy. The present invention may therefore perform object detection in low-light, snow, rain, glare fog or other low-contrast conditions for improved roadway and intersection control. Regardless, a confirmation of the presence 171 or absence 172 of an object 102 at a traffic intersection 106 from images 111 taken from different sensors 120 greatly improves traffic detection and signaling efficiency.

In one embodiment, the present invention may also include an approach that incorporates a highly robust model that learns roadway structures to improve sensing accuracy in a traffic management system. Such a roadway structure model provides a high confidence that learned structures correspond to physical roadway structures, and is robust to short-term changes in lighting conditions, such as shadows cast by trees, buildings, clouds, vehicles, rain, fog, etc. Such a model also adaptively learns long-term appearance changes of the roadway structures caused by natural wear and tear, seasonal changes in lighting (winter vs. summer), etc. The model also exhibits a low decision time (in milliseconds) for responding to occlusions caused by fast moving traffic, and low computational complexity capable of running on an embedded computing platform. Incorporating such a model as an overlay onto a combined detection zone 117, or in conjunction with a combined detection zone 117, may therefore also serve to increase detection accuracy in the framework 100.

The present invention may also include an artificial intelligence component that is configured to continually learn roadway structures and apply them to differentiate objects from each other and from other roadway items. The use of artificial intelligence in analyzing data is now prevalent, and one of the most common artificial intelligence-based tools for identifying and learning patterns in such large-scale data collections, often referred to as "big data," is the artificial neural network (ANN). In particular, neural networks trained through a technique referred to as backpropagation are able to learn the associations between a set of predictive variables, and a measured response or outcome. Neural networks may also be trained by any number of other optimization techniques, and once trained, the ANN can then be used to predict responses or outcomes in new situations, where only the values of the predictors are known, or, in some cases, where additional predictors can themselves be generated from known predictors and used to aid in the prediction of responses or outcomes in new situations. For example, if objects 102 are detected across a range of different operational situations involving different sensors 120, ANNs can be used to identify how these observed detections related to underlying conditions of each sensor 120 at the time an image was taken. Then, going forward, the ANN trained on historical data can be applied to new images 111 in order to predict whether the sensor will have accurately detected an object 102.

The image processing component 144 is, in one aspect of the present invention, configured to analyze pixel attributes and characteristics 158 in images 111 comprising the sensor data 118 for a field of view 114, representing the one or more lanes of the roadway 104. Analyzing pixel attributes and characteristics 158 is performed in the present invention to detect, identify and classify objects 102 once detection zones 114 have been fused into a combined detection zone 117. This may be performed by analyzing multi-dimensional data point attributes, using one or more of the techniques noted herein.

In one embodiment, the image processing component 144 classifies an object 102 by associating groups of moving pixels having common pixel characteristics. This represents an analysis of the "whole scene" of the field of view 114 to distinguish between foreground objects and background objects. In such an embodiment, the framework processes temporal information in the combined detection zone 117 to analyze the foreground of the field of view 114, and processes spatial information to learn a detection zone background model.

Such a temporal analysis of the "whole scene" associates data points, such as for example pixels, uses common data point characteristics and attempts to identify one or more groups of moving data points. Common data point characteristics enable an initial identification of a group of moving data points as a foreground object, and these at least include a color, a luminance, a position, and movement of the data points to identify an object in motion. The image processing component 144 may further determine if a group of moving pixels represent one or more foreground objects inside the combined object detection zone 117, and identify an object type of the one or more foreground objects based on dominant object type features. Such features include pixel intensity, edges, texture content, shape, object attributes, and object tracking attributes for each object type.

The image processing component 144 may apply the detection zone background model to examine specific data point attributes 158 within the combined detection zone 117, and attempt to adaptively learn what is in the background over time. The learned model is then applied to differentiate all of or a portion of detection zone data points from known background objects. In this embodiment, the present invention extracts multi-dimensional spatial features, and then learns statistical thresholds for background characteristics, resulting in an adaptive model of the background that is continuously generated and adjusted as additional sensor data 118 is ingested. Through this process of analyzing spatial information, the framework 100 continually, learns what objects are part of the background.

Background characteristics include one or more of a roadway surface, roadway or lane markings, and roadway shadows within the combined detection zone 117. These may include permanent and temporary characteristics as well as items which change over time at different rates. Examples of these multi-dimensional data point attributes 158 include a pixel histogram, directional edges, and a gray scale mean. Other examples include a motion analysis (optical flow), frame difference data, and corner features.

Examples of image processing techniques for such object detection and identification may be further found in U.S. Pat. No. 9,418,546.

Other embodiments incorporating different techniques for analyzing pixel attributes and characteristics 158 are also possible, and are within the scope of the present invention. For example, the image processing component 144 may apply particular techniques for identifying and classifying bicycles or pedestrians. In bicycle detection, the present invention may attempt to classify an object 102 by creating a virtual bicycle zone in one or more lanes of the roadway 104 to specifically identify bicycles therein. The virtual bicycle zone is created and positioned in vehicular lanes and bicycle-specific lanes as desired, and a bicycle detection strip is automatically generated on top of and at a specified point adjacent to each virtual bicycle zone. The bicycle detection strip is an extension of the virtual bicycle zone and is generated based on a number of considerations. It is an area adjacent to the virtual bicycle zone that is automatically generated and represents an initial "triggering" area of the virtual bicycle zone that is invisible to the traffic engineers and other users.

In such an embodiment, the image processing component 144 may use object pattern recognition in an attempt to determine if the object 102 present in the bicycle detection strip is a narrow object or a wide object. If it is a narrow object, and detection is indicated in the virtual bicycle zone, then a bicycle will be identified. If it is a wide object and detection is indicated in the virtual bicycle zone, a regular motorized vehicle will be identified, and the detection will be rejected as "not a bicycle." The framework 100 of the present invention may therefore attempt to classify all moving objects 102 into two classes: narrow moving objects (assumed to be bicycles) and wide moving objects (assumed to not be bicycles). Alternatively, objects may be classified by one or more classifiers 159 such as an image classifier, which apply machine learning and artificial intelligence techniques to train the one or more classifiers 159. For example, bicycles may also be identified by a machine learning-based image classifier 159 that is trained on several exemplary images that serve as training data to correctly determine the presence of bicycle objects in an image.

Examples of image processing techniques for bicycle differentiation may be further found in U.S. Pat. No. 8,933,818.

In pedestrian detection, the image processing component 144 of the framework 100 applies an object movement analysis to identify and differentiate pedestrians from other roadway users, and track their position as the move through the field of view 114. Pedestrians have characteristics that differ markedly from other roadway objects 102, such as vehicles and bicycles. These characteristics include, but are not limited to, size, gesture, speed, and entry and points in the field of view 114. Standard intersection roadway markings and lane structures may also be used to identify areas where pedestrians should be traveling.

The present invention analyzes motion strength and frequency of activity of pixels in such an object movement analysis, and this may include computing a binary thresholded image defining a histogram of oriented gradient features that further define a pedestrian contour, and updating the histogram as pixel activity occurs in the changing image. This may also include a part-based object recognition analysis, and image analysis using a histogram of oriented gradient features to develop a model of a single walking pedestrian using a statistical classifier 159, which may also include applying one or more machine learning and artificial intelligence techniques to train statistical classifiers 159 to develop such a single walking pedestrian model.

Examples of image processing techniques for pedestrian detection and classification may be further found in U.S. Pat. Nos. 9,449,506, 9,460,613, and 9,607,402.

In another embodiment of the present invention, a user may configure one or more aspects of the enhanced traffic detection framework 100 using a traffic management support tool 180. Additionally, output data 170 regarding objects 102 may be provided directly to the traffic management support tool 180.

Various aspects of the enhanced traffic detection framework 100 may be configured in a number of ways using the traffic management support tool 180. For example, the detection zones 114 may be initialized and configured by a user via the traffic management support tool 180, such as via an application resident on a computing device and/or using a graphical user interface. The user may select a specific size and location of one or both of a field of view 114 and an object detection zone 114 in relation to a traffic intersection 106, or other portion of a roadway 104. The field of view 112 and object detection zones 114 may be pre-selected by a user prior to performance of the data processing paradigms defined herein, and may also be adjusted by the user during system performance. Alternatively, the size, location, and number of object detection zones 114 may be automatically selected and adjusted.

Regardless, the traffic management support tool 180 supports both zone and lane analytics 192, a traffic management system 194, and a traffic signal controller system 196 using the output data 170. The traffic management support tool 180 may include widgets, drop-down menus, and other indicia presented via a graphical user interface that enable a user to make selections and perform functions attendant to operation of the enhanced traffic detection framework 100.

The systems and methods of the present invention may be implemented in many different computing environments 130. For example, they may be implemented in conjunction with a special purpose computer, a programmed microprocessor or microcontroller and peripheral integrated circuit element(s), an ASIC or other integrated circuit, a digital signal processor, electronic or logic circuitry such as discrete element circuit, a programmable logic device or gate array such as a PLD, PLA, FPGA, PAL, GPU and any comparable means. In general, any means of implementing the methodology illustrated herein can be used to implement the various aspects of the present invention. Exemplary hardware that can be used for the present invention includes computers, handheld devices, telephones (e.g., cellular, Internet enabled, digital, analog, hybrids, and others), and other such hardware. Some of these devices include processors (e.g., a single or multiple microprocessors or general processing units), memory, nonvolatile storage, input devices, and output devices. Furthermore, alternative software implementations including, but not limited to, distributed processing, parallel processing, or virtual machine processing can also be configured to perform the methods described herein.

The systems and methods of the present invention may also be wholly or partially implemented in software that can be stored on a non-transitory computer-readable storage medium, executed on programmed general-purpose computer with the cooperation of a controller and memory, a special purpose computer, a microprocessor, or the like. In these instances, the systems and methods of this invention can be implemented as a program embedded on a mobile device or personal computer through such mediums as an applet, JAVA® or CGI script, as a resource residing on one or more servers or computer workstations, as a routine embedded in a dedicated measurement system, system component, or the like. The system can also be implemented by physically incorporating the system and/or method into a software and/or hardware system.

Additionally, the data processing functions disclosed herein may be performed by one or more program instructions stored in or executed by such memory, and further may be performed by one or more modules configured to carry out those program instructions. Modules are intended to refer to any known or later developed hardware, software, firmware, machine learning, artificial intelligence, fuzzy logic, expert system or combination of hardware and software that is capable of performing the data processing functionality described herein.

The foregoing descriptions of embodiments of the present invention have been presented for the purposes of illustration and description. It is not intended to be exhaustive or to limit the invention to the precise forms disclosed. Accordingly, many alterations, modifications and variations are possible in light of the above teachings, may be made by those having ordinary skill in the art without departing from the spirit and scope of the invention. For example, the transformation matrix 156 may comprise a homography matrix, an affine transformation, or any other transformation function, depending on the number of boundary points utilized. It is therefore intended that the scope of the invention be limited not by this detailed description. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

The invention claimed is:

1. A method, comprising:
   receiving input data representing a field of view of a roadway at or near a traffic intersection, the input data including data collected from a first sensor, and data collected from a second sensor;
   analyzing the input data within a computing environment in one or more data processing modules executed in conjunction with at least one specifically-configured processor, the one or more data processing modules configured to detect an object in the field of view of the roadway, by
   evaluating an accuracy of the data obtained from the first sensor, by relating one or more attributes representing object characteristics in the data obtained from the first sensor to known attributes representing one or more objects, and
   fusing the data from the first sensor with the data from the second sensor to create a combined detection zone in the field of view of the roadway where the one or more attributes representing object characteristics are below a threshold level for accurate detection, relative to the known attributes, by
      identifying a first object detection zone in the field of view from the data collected from the first sensor, and a second object detection zone in the field of view from the data collected from the second sensor,
      selecting a plurality of boundary points in the first object detection zone, and a plurality of points in the second object detection zone that correspond to the boundary points in the first detection zone,
      estimating a transformation matrix for a planar area comprising the field of view by mapping the plurality of points in a plane of the road roadway as seen by the second sensor, to the plurality of boundary points in a plane of the roadway as seen by the first sensor to correct a perspective distortion between the data collected by the first sensor and the data collected by the second sensor to transpose the first object detection zone onto the second object detection zone, by applying the selected points that correspond to the plurality of boundary points to calibrate arbitrary planar coordinates between the first object detection zone and the second object detection zone, and mapping a plurality of vectors representing common data points to transform the arbitrary planar coordinates to find an equivalent zone location and an equivalent shape between the first object detection zone and the second object detection zone; and
   generating an output signal to a traffic signal controller where an object is present in the combined detection zone.

* * * * *